(12) United States Patent
Lee

(10) Patent No.: US 7,650,556 B2
(45) Date of Patent: Jan. 19, 2010

(54) SYSTEM AND METHOD FOR CHECKING AND CORRECTING BIOS ERRORS

(75) Inventor: Ming-Lung Lee, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 596 days.

(21) Appl. No.: 11/309,457

(22) Filed: Aug. 10, 2006

(65) Prior Publication Data

US 2007/0136638 A1    Jun. 14, 2007

(30) Foreign Application Priority Data

Nov. 24, 2005    (CN) .................. 2005 1 0101740

(51) Int. Cl.
*H03M 13/00*    (2006.01)
(52) U.S. Cl. ..................... 714/758; 714/6; 714/807; 714/801; 702/189
(58) Field of Classification Search ................ 714/758, 714/801, 807, 6; 702/189
See application file for complete search history.

(56) References Cited

U.S. PATENT DOCUMENTS

| 2004/0230864 | A1 | 11/2004 | Kim | |
| 2005/0055621 | A1* | 3/2005 | Adelmann et al. | 714/758 |
| 2006/0048031 | A1* | 3/2006 | Aadsen et al. | 714/733 |

* cited by examiner

*Primary Examiner*—Guy J Lamarre
(74) *Attorney, Agent, or Firm*—Winston Hsu

(57) ABSTRACT

A system for checking and correcting BIOS errors is provided. The system includes a program loading module (1001) for loading main programs from a BIOS ROM into a RAM; a checksum calculating module (1002) for reading the original checksum, and for calculating a new checksum for the main programs loaded in the RAM; an error checking module (1003) determining if the new checksum equals the original checksum; an error checking module for comparing the new checksum with the original checksum to identify errors in the main programs; and an error correcting module (1004) for correcting the errors in the main programs loaded in the RAM. A related method is also disclosed.

7 Claims, 3 Drawing Sheets

SYSTEM AND METHOD FOR CHECKING AND CORRECTING BIOS ERRORS

FIELD OF THE INVENTION

The present invention generally relates to the field of basic input output system (BIOS), and more particularly to a system and method for checking and correcting BIOS errors.

DESCRIPTION OF RELATED ART

Typically, basic input output system (BIOS) settings of computers, which include the date, time, models type and serial numbers of disk drives, number of memories, and the like, are stored in a complementary metal-oxide-semiconductor (CMOS) memory. Generally, the CMOS memory can be integrated into a chipset IC, such as the south bridge chipset IC.

When a computer system is powered on, the computer system executes a power on self test (POST) procedure so as to determine whether the basic peripherals can operate normally. Typically, the POST procedure is a very first program executed after the computer system is powered on. The BIOS is stored in a flash memory on a motherboard in the computer, and has many basic subprograms for initializing the motherboard settings and communications between the software and hardware. When the computer system boots up, the BIOS determines whether all peripheral devices are configured to operate. If so, the BIOS loads an operating system (OS) from the hard disk or floppy disk into a random access memory (RAM). The BIOS allows the OS and applications to obtain detailed data about input/output devices, such as the medium access control (MAC) address, the capacity and position of the disk drive, and the like. The BIOS settings can also be modified to inform the OS or the applications when any peripheral devices are changed.

When the BIOS settings have errors, a previous BIOS settings needs to be recovered. Currently, manufacturers often use a dual BIOS, a carrier BIOS or a network recovery method to correct BIOS errors. In the dual BIOS, a main BIOS and a sub-BIOS are used for recording same contents installed on the motherboard of the computer. When the computer is powered on, the sub-BIOS checks if the main BIOS settings are the same as the settings of the sub-BIOS. If the settings of the main BIOS are different from the settings of the sub-BIOS, the sub-BIOS will overwrites and recovers the main BIOS automatically. With carrier BIOS, contents of the BIOS are copied to a carrier (e.g. a hard disk). When the BIOS has errors, the carrier recovers the BIOS by utilizing the copied contents. Additionally, with the network recovery, a remote server is used for a correction BIOS to recover a destroyed BIOS of a client computer via a network.

However, the dual BIOS method needs two BIOS that increases the manufacturing cost. The carrier BIOS and the network recovery manner depends heavily on the situation of the carrier or the network. When the carrier or the network has been destroyed, it cannot recover the BIOS.

What is needed, therefore, is a system and method for checking and correcting BIOS errors, that can automatically check and correct the BIOS errors in a computer when the BIOS has errors, so as to reduce the manufacturing cost, and assure the BIOS working normally.

SUMMARY OF THE INVENTION

A system for checking and correcting BIOS errors is disclosed. The system is installed in a BIOS ROM in a computer. The system includes: a program loading module for loading main programs from the BIOS ROM into a RAM; a checksum calculating module for reading an original checksum, and for calculating a new checksum for the main programs loaded in the RAM by utilizing logic algorithms similar to the logic algorithms for calculating the original checksum; an error checking module determining whether the new checksum equals the original checksum; an error checking module for comparing the new checksum with the original checksum to identify errors in the main programs loaded in the RAM if the new checksum doesn't equal the original checksum; and an error correcting module for correcting the errors in the main programs loaded in the RAM.

Further, a preferred method for checking and correcting BIOS errors is also disclosed. The method includes the steps of: loading main programs from a BIOS ROM into a RAM; reading an original checksum; calculating a new checksum for the loaded main programs by utilizing logic algorithms similar to the logic algorithms for calculating the original checksum; determining whether the new checksum equals the original checksum; comparing the new checksum with the original checksum for identify errors in the main programs loaded in the RAM if the new checksum doesn't equal the original checksum; and correcting the errors in the main programs loaded in the RAM.

Other advantages and novel features of the embodiments will be drawn from the following detailed description with reference to the attached drawings, in which:

DETAILED DESCRIPTION OF THE INVENTION

In order to describe the preferred embodiment conveniently, here we give the following technical term:

Checksum: a value calculated by using a series of logic algorithms. It is usually viewed as an easy checking method in the communication and data processing field.

Figure 1:
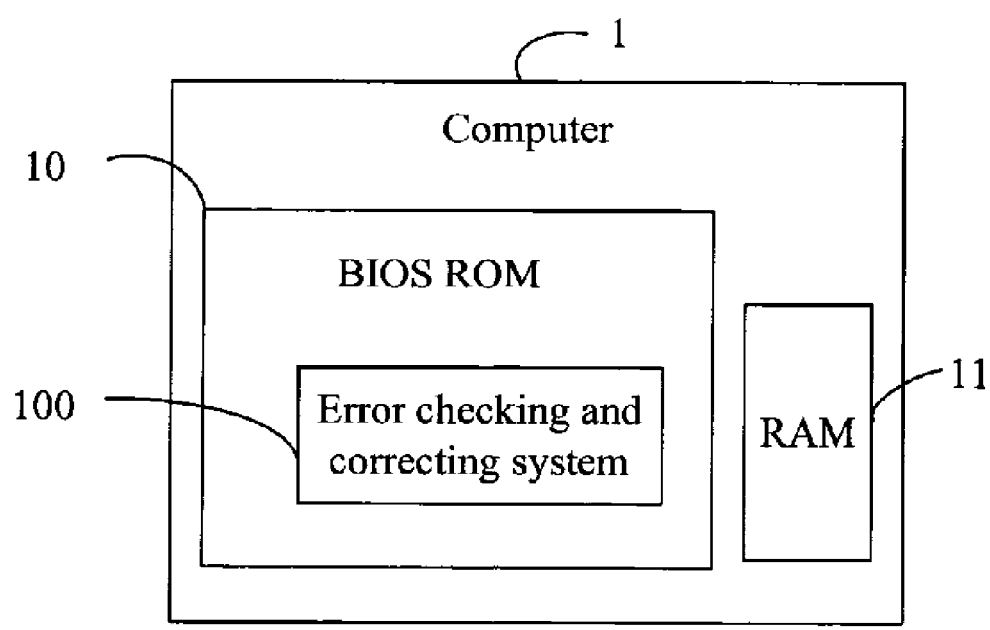
FIG. 1 is a schematic diagram of a computer for implementing a system for checking and correcting BIOS errors in accordance with a preferred embodiment.

FIG. 1 is a schematic diagram of a computer 1 for implementing a system for checking and correcting BIOS errors (hereinafter, "the error checking and correcting system 100") in accordance with a preferred embodiment. The computer 1 typically includes a random access memory (RAM) 11 and a BIOS ROM (read-only memory) 10 installed in a motherboard. The BIOS ROM 10 is used for transmitting data between hardware and software of the computer 1. By executing a program stored in the BIOS ROM 10, the computer 1 is able to analyze the performances of a central processing unit (CPU), drive a floppy disk or a hard disk, load an operation system, and so on. The checking and correcting system 100 burnt on the BIOS ROM 10 is configured for identifying whether the BIOS has errors and for correcting the BIOS errors, ensuring successful initialization of the hardware and a boot up of the computer 1.

The BIOS ROM 10 is further burnt boot programs, original main programs, and error correcting data before the BIOS ROM 10 is installed on the motherboard of the computer 1.

The original main programs consist of many basic subprograms for the input and output of the computer 1. For example, a hard disk drive program is configured for initializing and driving a hard disk of the computer 1. However, when peripheral devices of the computer 1 are changed, the original main programs in the BIOS ROM 10 may have data inconsistencies. That is, the main programs in the BIOS ROM 10 have errors. The error correcting data include a correction file of the original main programs, and an original checksum of the original main programs. The original checksum is calculated based on the original main programs by using a series of logic algorithms. The error correcting data cannot be arbitrarily changed when the computer 1 is in use.

Figure 2:
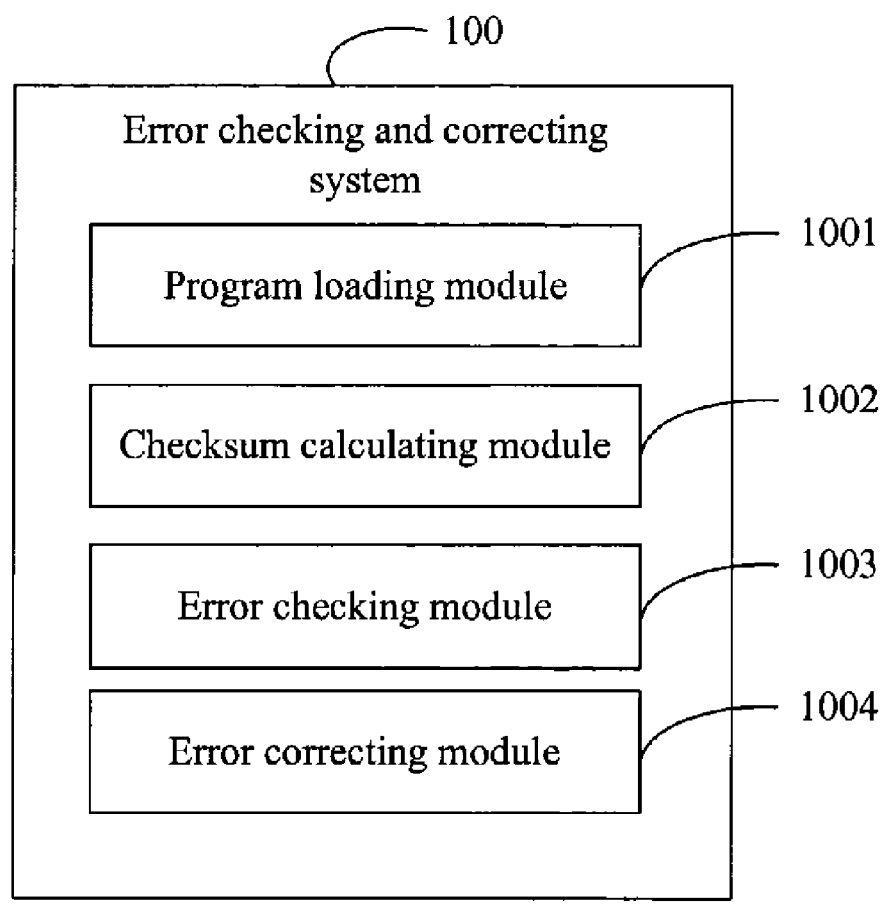
FIG. 2 is schematic diagram of function modules of error checking and correcting system of FIG. 1.

FIG. 2 is a schematic diagram of function modules of the error checking and correcting system 100 of FIG. 1. The error checking and correcting system 100 includes a program loading module 1001, a checksum calculating module 1002, an error checking module 1003, and an error correcting module 1004.

When the computer 1 is powered on, the computer 1 executes a power on self test (POST) procedure so as to determine whether the basic peripherals can operate normally. That is, the BIOS ROM 10 begins executing. The program loading module 1001 then loads the main programs from the BIOS ROM 10 into the RAM 11. The checksum calculating module 1002 reads the original checksum from the BIOS ROM 10, and calculates a new checksum for the main programs loaded in the RAM 11 by utilizing logic algorithms similar to the logic algorithms for calculating the original checksum.

After the new checksum is calculated, the error checking module 1003 determines whether the new checksum equals the original checksum. If the new checksum doesn't equal the original checksum, the error checking module 1003 compares the new checksum with the original checksum to identify errors in the main programs loaded in the RAM 11. Finally, the error correcting module 1004 corrects the errors in the main programs loaded in the RAM 11 by utilizing the correction file in the BIOS ROM 10. After the above mentioned procedures is finished, the computer 1 continues executing the POST procedure when the errors have been corrected.

Figure 3:
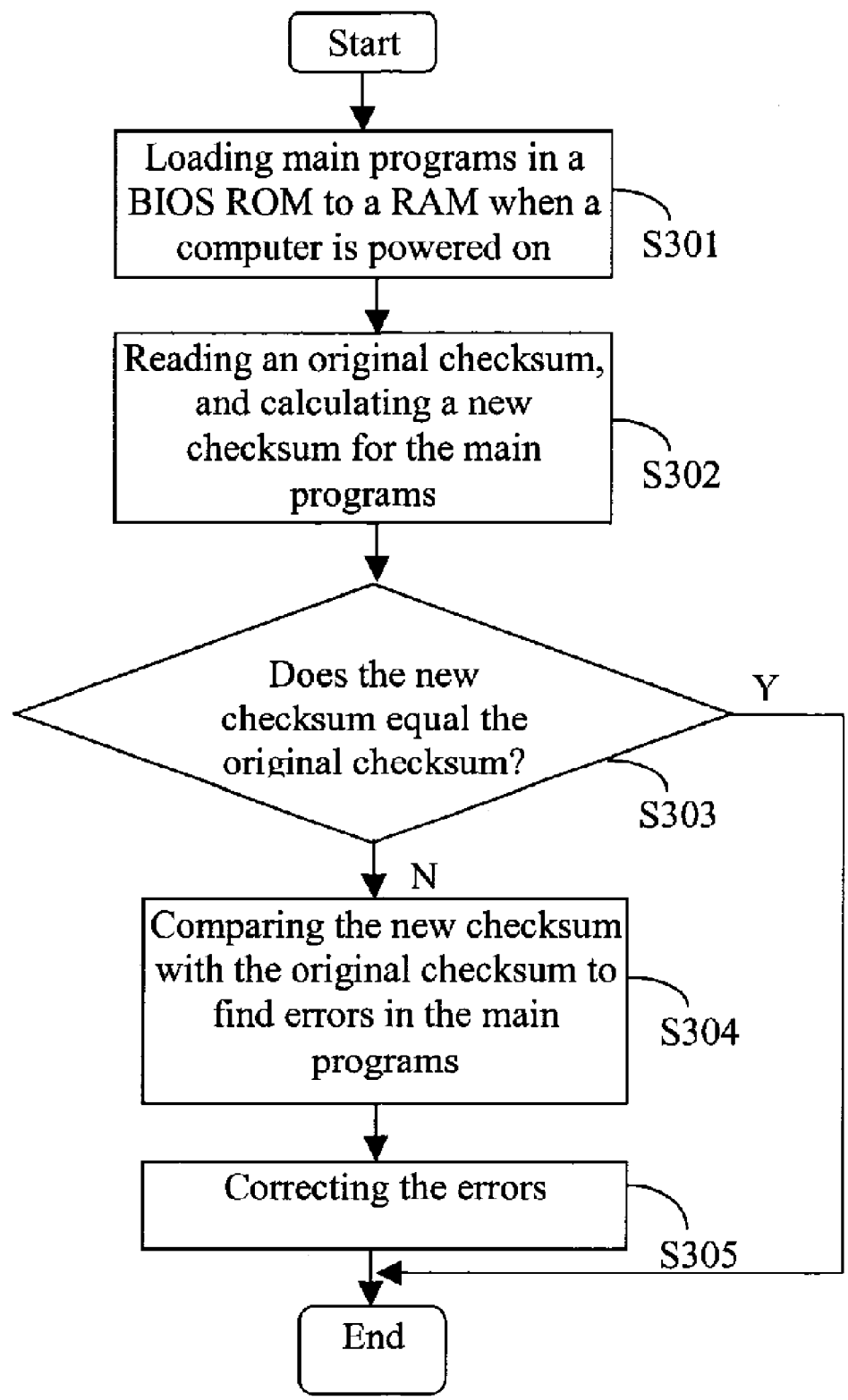
FIG. 3 is a flow chart of a preferred method for checking and correcting BIOS errors by implementing the system of FIG. 2.

FIG. 3 is a flow chart of a preferred method for checking and correcting BIOS errors by implementing the system as described above. In step S301, when the computer is powered on, the program loading module 1001 loads the main programs from the BIOS ROM 10 into the RAM 11. The main programs consist of many basic subprograms for inputs and outputs of the computer 1. The error correcting data include the correction file of the original main programs, and an original checksum of the original main programs.

In step S302, the checksum calculating module 1002 reads the original checksum from the BIOS ROM 10, and calculates the new checksum for the main programs loaded in the RAM 11 by using logic algorithms similar to the logic algorithms for calculating the original checksum. In step S303, the error checking module 1003 determines whether the new checksum equals the original checksum. If the new checksum equals the original checksum, the procedure goes to end.

Otherwise, if the new checksum doesn't equal the original checksum, in step S304, the error checking module 1003 compares the new checksum with the original checksum to identify errors in the main programs loaded in the RAM 11. In step S305, the error correcting module 1004 corrects the errors in the main programs loaded in the RAM 11 by utilizing the correction file.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for checking and correcting basic input output system (BIOS) errors, comprising:
    a program loading module configured for loading main programs from a BIOS read only memory (ROM) into a random access memory (RAM);
    a checksum calculating module configured for reading an original checksum from the BIOS ROM, and for calculating a new checksum for the main programs loaded in the RAM by utilizing logic algorithms similar to logic algorithms for calculating the original checksum;
    an error checking module configured for determining whether the new checksum equals the original checksum to determine whether the main programs have errors;
    an error checking module configured for comparing the new checksum with the original checksum to identify the errors; and
    an error correcting module configured for correcting the errors.

2. The system according to claim 1, wherein the original checksum is calculated based on original main programs by utilizing a series of logic algorithms.

3. The system according to claim 2, wherein the error correcting module corrects the BIOS errors by using a correction file of the original main programs in the BIOS ROM.

4. A method for checking and correcting basic input output system (BIOS) errors, the method comprising the steps of:
    loading main programs from a BIOS read only memory (ROM) into a random access memory (RAM);
    reading an original checksum from the BIOS ROM;
    calculating a new checksum for the main programs loaded in the RAM by utilizing a series of logic algorithms similar to logic algorithms for calculating the original checksum;
    determining whether the new checksum equals the original checksum to determine whether the main programs have errors;
    comparing the new checksum with the original checksum to identify the errors in the main programs, if the new checksum doesn't equal the original checksum; and
    correcting the the errors in the main programs loaded in the RAM.

5. The method according to claim 4, further comprising the step of:
    ending the checking procedure if the new checksum equals the original checksum.

6. The method according to claim 4, wherein the manner of correcting the BIOS errors is utilizing a correction file of main programs.

7. The method according to claim 4, wherein the original checksum is calculated based on original main programs by utilizing a series of logic algorithms.

* * * * *

UNITED STATES PATENT AND TRADEMARK OFFICE
CERTIFICATE OF CORRECTION

PATENT NO.       : 7,650,556 B2                                         Page 1 of 1
APPLICATION NO.  : 11/309457
DATED            : January 19, 2010
INVENTOR(S)      : Ming-Lung Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-third Day of November, 2010

David J. Kappos
*Director of the United States Patent and Trademark Office*